US008409014B2

(12) United States Patent
Gagner et al.

(10) Patent No.: US 8,409,014 B2
(45) Date of Patent: *Apr. 2, 2013

(54) WAGERING GAME SYSTEM WITH SHARED OUTCOME DETERMINED BY A GAMING MACHINE

(75) Inventors: Mark B. Gagner, West Chicago, IL (US); Larry J. Pacey, Chicago, IL (US); Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/160,639

(22) Filed: Jun. 15, 2011

(65) Prior Publication Data

US 2011/0244938 A1 Oct. 6, 2011

Related U.S. Application Data

(63) Continuation of application No. 11/920,315, filed as application No. PCT/US2006/018045 on May 9, 2006, now Pat. No. 7,980,954.

(60) Provisional application No. 60/682,050, filed on May 19, 2005.

(51) Int. Cl.
*G06F 17/00* (2006.01)

(52) U.S. Cl. .......................................................... 463/42

(58) Field of Classification Search .................... 463/25, 463/42, 16–17; 273/237

See application file for complete search history.

(56) References Cited

U.S. PATENT DOCUMENTS

| | | | | |
|---|---|---|---|---|
| 4,572,509 A | 2/1986 | Sitrick | ............................ | 273/85 |
| 5,393,057 A | 2/1995 | Marnell, II | ...................... | 273/85 |
| 5,580,309 A | 12/1996 | Piechowiak et al. | ............ | 463/16 |
| 5,711,715 A | 1/1998 | Ringo et al. | ...................... | 473/9 |
| 5,755,621 A | 5/1998 | Marks et al. | ..................... | 463/42 |
| 5,779,549 A | 7/1998 | Walker et al. | ................... | 463/42 |
| 5,830,063 A | 11/1998 | Byrne | ............................. | 463/18 |
| 6,039,648 A | 3/2000 | Guinn et al. | .................... | 463/16 |
| 6,077,162 A | 6/2000 | Weiss | ............................. | 463/26 |
| 6,089,980 A | 7/2000 | Gauselmann | ................... | 463/27 |
| 6,142,872 A | 11/2000 | Walker et al. | ................... | 463/16 |
| 6,287,202 B1 | 9/2001 | Pascal et al. | ..................... | 463/42 |
| 6,293,865 B1 | 9/2001 | Kelly et al. | ..................... | 463/16 |
| 6,309,299 B1 | 10/2001 | Weiss | .............................. | 463/20 |
| 6,364,314 B1 | 4/2002 | Canterbury | .................. | 273/274 |
| 6,416,408 B2 | 7/2002 | Tracy et al. | ..................... | 463/16 |
| 6,800,026 B2 | 10/2004 | Cannon | ........................... | 463/16 |
| 6,837,793 B2 | 1/2005 | McClintic | ....................... | 463/42 |
| 6,869,361 B2 | 3/2005 | Sharpless et al. | ............... | 463/25 |
| 6,884,167 B2 | 4/2005 | Walker et al. | ................... | 463/20 |
| 6,887,154 B1 | 5/2005 | Luciano, Jr. et al. | ........... | 463/26 |

(Continued)

FOREIGN PATENT DOCUMENTS

| | | |
|---|---|---|
| JP | 2002-312612 | 10/2002 |
| WO | WO 98/51384 | 11/1998 |

(Continued)

OTHER PUBLICATIONS

PCT International Search Report for International Application No. PCT/US/2006/18045 dated Sep. 18, 2007 (3 pages).

(Continued)

*Primary Examiner* — Masud Ahmed

(74) *Attorney, Agent, or Firm* — Nixon Peabody LLP

(57) ABSTRACT

A gaming system for playing a wagering game and a community event includes a first gaming machine and a second gaming machine. The first gaming machine determines a randomly selected community-event outcome for the community event, and sends information related to the outcome to at least one other gaming machine of the plurality of gaming machines. The second gaming machine receives the information from the first gaming machine and plays the community event.

24 Claims, 5 Drawing Sheets

U.S. PATENT DOCUMENTS

| | | | | |
|---|---|---|---|---|
| 6,908,390 | B2 | 6/2005 | Nguyen et al. | 463/42 |
| 6,916,244 | B2 | 7/2005 | Gatto et al. | 463/25 |
| 6,916,245 | B1 | 7/2005 | Vancura et al. | 463/26 |
| 6,921,331 | B2 | 7/2005 | Gatto et al. | 463/6 |
| 7,077,744 | B2 | 7/2006 | Cannon | 463/20 |
| 7,097,562 | B2 | 8/2006 | Gagner | 463/42 |
| 7,169,041 | B2 | 1/2007 | Tessmer et al. | 463/16 |
| 7,234,117 | B2 | 6/2007 | Zaner et al. | 715/758 |
| 7,270,605 | B2 | 9/2007 | Russell et al. | 463/40 |
| 7,662,040 | B2 | 2/2010 | Englman et al. | 463/42 |
| 2002/0039923 | A1 | 4/2002 | Cannon et al. | 463/42 |
| 2002/0065097 | A1 | 5/2002 | Brockenbrough et al. | 455/552 |
| 2002/0077170 | A1 | 6/2002 | Johnson et al. | 463/16 |
| 2002/0119824 | A1 | 8/2002 | Allen | 463/42 |
| 2003/0036430 | A1 | 2/2003 | Cannon | 463/42 |
| 2003/0060264 | A1 | 3/2003 | Chilton et al. | 463/20 |
| 2003/0070178 | A1 | 4/2003 | Boyd et al. | 725/110 |
| 2003/0119576 | A1 | 6/2003 | McClintic et al. | 463/20 |
| 2003/0125107 | A1 | 7/2003 | Cannon | 463/25 |
| 2003/0186733 | A1 | 10/2003 | Wolf et al. | 463/16 |
| 2003/0190960 | A1 | 10/2003 | Jokipii et al. | 463/42 |
| 2004/0087368 | A1 | 5/2004 | Gauselmann | 463/42 |
| 2004/0121842 | A1 | 6/2004 | Willis et al. | 463/42 |
| 2004/0139468 | A1 | 7/2004 | Kidd | 725/86 |
| 2004/0204226 | A1 | 10/2004 | Foster et al. | 463/20 |
| 2004/0248637 | A1 | 12/2004 | Liebenberg et al. | 463/16 |
| 2004/0260761 | A1 | 12/2004 | Leaute et al. | 709/201 |
| 2005/0003881 | A1 | 1/2005 | Byng | 463/16 |
| 2005/0003886 | A1 | 1/2005 | Englman et al. | 463/25 |
| 2005/0020340 | A1 | 1/2005 | Cannon | 463/16 |
| 2005/0043088 | A1 | 2/2005 | Nguyen et al. | 463/29 |
| 2005/0043089 | A1 | 2/2005 | Nguyen et al. | 463/29 |
| 2005/0043094 | A1 | 2/2005 | Nguyen et al. | 463/42 |
| 2005/0071024 | A1 | 3/2005 | Henshaw | 700/91 |
| 2005/0071481 | A1 | 3/2005 | Danieli | 709/229 |
| 2005/0076092 | A1 | 4/2005 | Chang et al. | 709/217 |
| 2005/0096133 | A1 | 5/2005 | Hoefelmeyer et al. | 463/40 |
| 2005/0102047 | A1 | 5/2005 | Ottofy | 700/91 |
| 2005/0113162 | A1 | 5/2005 | Olive et al. | 463/16 |
| 2005/0282628 | A1 | 12/2005 | Beatty et al. | 463/27 |
| 2005/0282637 | A1 | 12/2005 | Gatto et al. | 463/42 |
| 2006/0010204 | A1 | 1/2006 | Jalava et al. | 709/205 |
| 2006/0030959 | A1 | 2/2006 | Duhamel | 700/91 |
| 2006/0040742 | A1 | 2/2006 | Wright et al. | 463/42 |
| 2006/0073880 | A1 | 4/2006 | Thomas | 463/20 |
| 2006/0073897 | A1 | 4/2006 | Englman et al. | 463/42 |
| 2006/0082056 | A1 | 4/2006 | Kane et al. | 273/138.1 |
| 2006/0094495 | A1 | 5/2006 | Gelber et al. | 463/20 |
| 2006/0111169 | A1 | 5/2006 | Hornik et al. | 463/16 |
| 2006/0111170 | A1 | 5/2006 | Hornik et al. | 463/16 |
| 2006/0121971 | A1 | 6/2006 | Slomiany et al. | 463/16 |
| 2006/0135243 | A1 | 6/2006 | Englman et al. | 463/16 |
| 2006/0135254 | A1 | 6/2006 | Thomas | 463/25 |
| 2006/0148565 | A1 | 7/2006 | Gauselmann et al. | 463/41 |
| 2006/0160625 | A1 | 7/2006 | Englman et al. | 463/42 |
| 2006/0178202 | A1 | 8/2006 | Hughes et al. | 463/20 |
| 2006/0183536 | A1 | 8/2006 | Gagner et al. | 463/26 |
| 2006/0183550 | A1 | 8/2006 | Gagner et al. | 463/42 |
| 2006/0194589 | A1 | 8/2006 | Sankisa | 455/456.1 |
| 2006/0234791 | A1 | 10/2006 | Nguyen et al. | 463/16 |
| 2006/0241795 | A1 | 10/2006 | Weingardt et al. | 700/91 |
| 2006/0252546 | A1 | 11/2006 | Castellari et al. | 463/42 |
| 2006/0287043 | A1 | 12/2006 | Englman et al. | 463/16 |
| 2006/0287106 | A1 | 12/2006 | Jensen | 463/42 |
| 2007/0054739 | A1 | 3/2007 | Amaitis et al. | 463/42 |
| 2007/0060317 | A1 | 3/2007 | Martin | 463/26 |
| 2007/0078962 | A1 | 4/2007 | Donnelli et al. | 709/223 |
| 2007/0087832 | A1 | 4/2007 | Abbott et al. | 463/42 |
| 2007/0111797 | A1 | 5/2007 | Sasaki et al. | 463/42 |
| 2007/0129147 | A1 | 6/2007 | Gagner | 463/42 |
| 2007/0136817 | A1 | 6/2007 | Nguyen | 726/26 |
| 2007/0149279 | A1 | 6/2007 | Norden et al. | 463/29 |
| 2007/0173324 | A1 | 7/2007 | Multerer et al. | 463/42 |
| 2007/0191100 | A1 | 8/2007 | Counts | 463/42 |
| 2007/0191105 | A1 | 8/2007 | Azuma | 463/42 |
| 2007/0218996 | A1 | 9/2007 | Harris et al. | 463/42 |
| 2008/0045341 | A1 | 2/2008 | Englman | 463/42 |
| 2009/0011822 | A1 | 1/2009 | Englman et al. | 463/25 |
| 2009/0011823 | A1 | 1/2009 | Englman et al. | 463/25 |
| 2009/0011824 | A1 | 1/2009 | Englman et al. | 463/42 |
| 2009/0011827 | A1 | 1/2009 | Englman et al. | 463/26 |
| 2009/0042641 | A1 | 2/2009 | Anderson et al. | 463/25 |
| 2009/0093298 | A1 | 4/2009 | Michel | 463/20 |
| 2009/0117969 | A1 | 5/2009 | Englman | 463/20 |
| 2009/0117974 | A1 | 5/2009 | Hornik | 463/20 |
| 2009/0176556 | A1 | 7/2009 | Gagner et al. | 463/25 |
| 2009/0253483 | A1 | 10/2009 | Pacey et al. | 463/25 |
| 2010/0041464 | A1 | 2/2010 | Arezina et al. | 463/22 |
| 2010/0056261 | A1 | 3/2010 | Englman et al. | 463/23 |
| 2010/0222123 | A1 | 9/2010 | Hornik | 463/16 |
| 2010/0267439 | A1 | 10/2010 | Englman et al. | 463/42 |
| 2010/0304843 | A1 | 12/2010 | Aoki et al. | 463/25 |
| 2011/0034239 | A1 | 2/2011 | Collette et al. | 463/26 |

FOREIGN PATENT DOCUMENTS

| | | | |
|---|---|---|---|
| WO | WO 01/99067 | A2 | 12/2001 |
| WO | WO 03/067175 | A1 | 8/2003 |
| WO | WO 03/083796 | A1 | 10/2003 |
| WO | WO 2005/077480 | A1 | 8/2005 |
| WO | WO 2005/102480 | A1 | 11/2005 |
| WO | WO 2005/113088 | A1 | 12/2005 |
| WO | WO 2006/015442 | A1 | 2/2006 |
| WO | WO 2006/028740 | A2 | 3/2006 |
| WO | WO 2006/039137 | A1 | 4/2006 |
| WO | WO 2006/121663 | A2 | 11/2006 |
| WO | WO 2007/006002 | A2 | 1/2007 |
| WO | WO 2007/030552 | A2 | 3/2007 |
| WO | WO 2007/030632 | A2 | 3/2007 |
| WO | WO 2007/030675 | A2 | 3/2007 |
| WO | WO 2007/030733 | A2 | 3/2007 |
| WO | WO 2007/030801 | A2 | 3/2007 |
| WO | WO 2007/087297 | A2 | 8/2007 |
| WO | WO 2007/103054 | A2 | 9/2007 |
| WO | WO 2007/127259 | A2 | 11/2007 |
| WO | WO 2008/133850 | A1 | 11/2008 |
| WO | WO 2008/143790 | A2 | 11/2008 |
| WO | WO 2009/051637 | A1 | 4/2009 |
| WO | WO 2009/052164 | A1 | 4/2009 |
| WO | WO 2009/086489 | A1 | 7/2009 |
| WO | WO 2010/002794 | A1 | 1/2010 |

OTHER PUBLICATIONS

PCT International Search Report for International Application No. PCT/US2008/012422 mailed Jan. 5, 2009 (1 page).

PCT International Written Opinion for International Application No. PCT/US2008/012422 mailed Jan. 5, 2009 (5 pages).

Third Party Submission filed Dec. 6, 2011 (2 pages).

WAGERING GAME SYSTEM WITH SHARED OUTCOME DETERMINED BY A GAMING MACHINE

CROSS REFERENCE TO RELATED APPLICATIONS

This application is a continuation of U.S. patent application Ser. No. 11/920,315, filed Nov. 13, 2007, and titled "Wagering Game System With Shared Outcome Determined By A Gaming Machine," now allowed, which is a U.S. national phase of International Application No. PCT/US2006/018045, filed May 9, 2006, and titled "Wagering Game System With Shared Outcome Determined By A Gaming Machine," which claims the benefit of priority of U.S. Provisional Patent Application No. 60/682,050 filed May 19, 2005, and titled "Wagering Game System With Shared Outcome Determined By A Gaming Machine," each of which is incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a gaming machine for determining a community-event outcome that is shared with other gaming machines of the gaming system.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

To provide randomly generated numbers related to the bonus game, some current bonus games use a random number generator that is included in a server of the bonus game. One problem associated with this type of server is that the server is categorized as a gaming machine and, therefore, it is required to meet numerous gaming regulations typically associated with a gaming machine. For example, this type of server is generally required to pass criteria related to randomness, fairness, and/or tampering. Thus, a need exists for a wagering game system with a bonus game, or community event, having a shared outcome that is determined by a gaming machine. The present invention is directed to satisfying this need and to solving other problems.

SUMMARY OF THE INVENTION

According to one aspect of the present invention, a gaming system for playing a wagering game and a community event includes a first gaming machine and a second gaming machine. The first gaming machine determines a randomly selected community-event outcome for the community event, and sends information related to the outcome to at least one other gaming machine of the plurality of gaming machines. The second gaming machine receives the information from the first gaming machine and plays the community event.

According to another aspect of the invention, a method of conducting a wagering game on a plurality of gaming machines that are eligible to play a community event includes determining a randomly selected community-event outcome within a first one of the plurality of gaming machines. The method further includes transmitting the outcome to the plurality of gaming machines participating in the community event. The community event is conducted at participating ones of the plurality of gaming machines in accordance with the community-event outcome.

According to yet another aspect of the invention, a method of conducting a wagering game having a community event includes providing a plurality of linked gaming machines for playing the community event. The method further includes initiating a session of the community event in which at least one of the plurality of linked gaming machines participate, and determining an outcome for the community event at one of the plurality of linked gaming machines. In addition, the method also includes sharing the outcome with at least one of the plurality of linked gaming machines.

According to yet another aspect of the invention, a computer readable storage medium or media is encoded with instructions for directing a gaming device to perform the above methods.

According to yet another aspect of the invention, a gaming system for playing wagering games that allow a player to be eligible for a community event includes a first gaming machine, a second gaming machine, and a third gaming machine of a plurality of linked gaming machines. The first gaming machine sends triggering information to other ones of the plurality of gaming machines. The triggering information is related to a randomly selected community-event triggering outcome. The second gaming machine plays the community event in response to receiving the triggering information. The third gaming machine determines a randomly selected community-event outcome, which is shared with at least the second gaming machine at which the community event is being played.

According to yet another aspect of the invention, a gaming system includes a plurality of linked gaming machines for playing a community event of a wagering game. Any one of the plurality of linked gaming machines dictates a randomly selected outcome of the community event. The outcome is shared with at least another one of the plurality of linked gaming machines at which the community event is being played.

Additional aspects of the invention will be apparent to those of ordinary skill in the art in view of the detailed description of various embodiments, which is made with reference to the drawings, a brief description of which is provided below.

DETAILED DESCRIPTION

Figure 1:
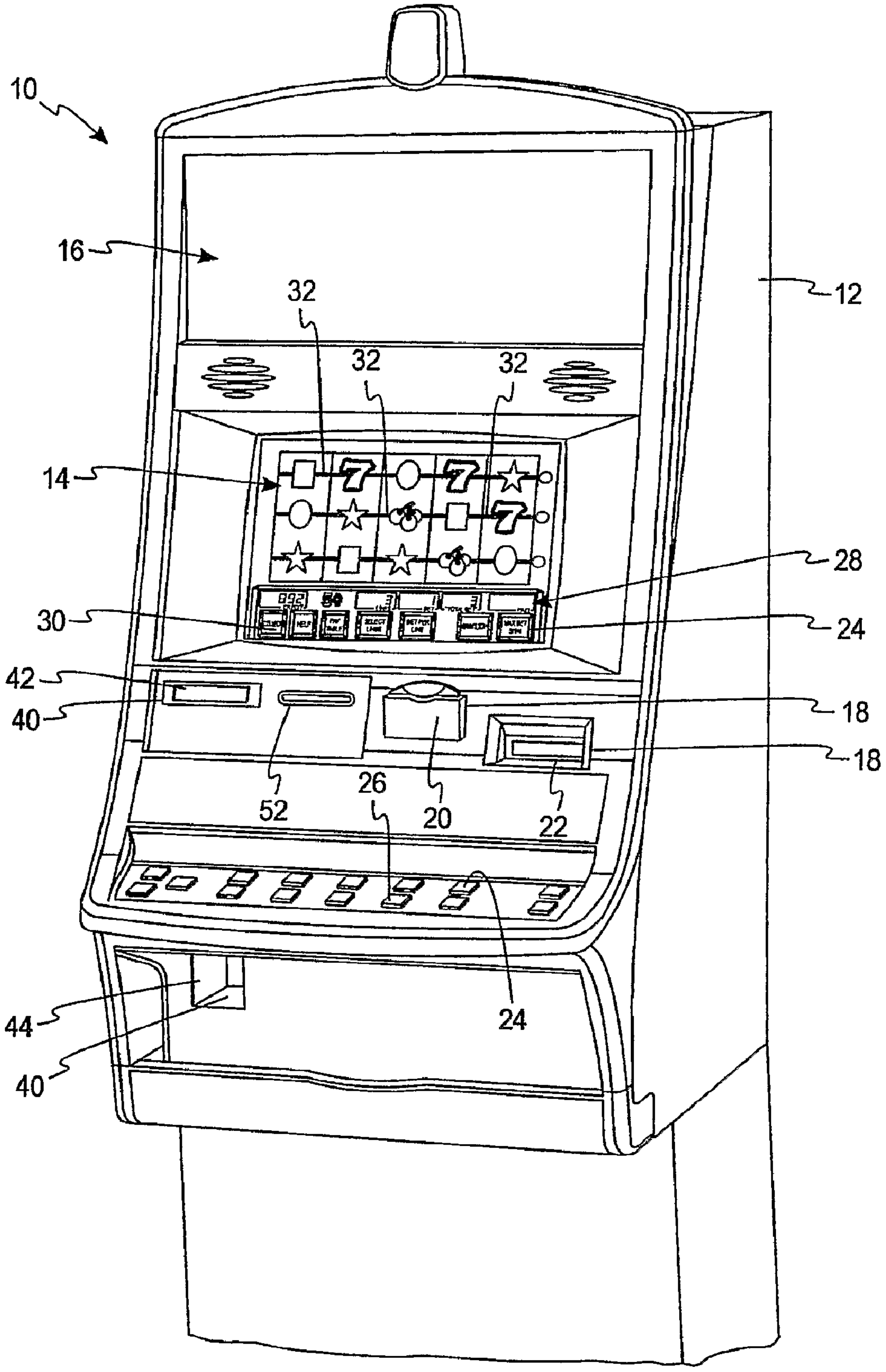
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
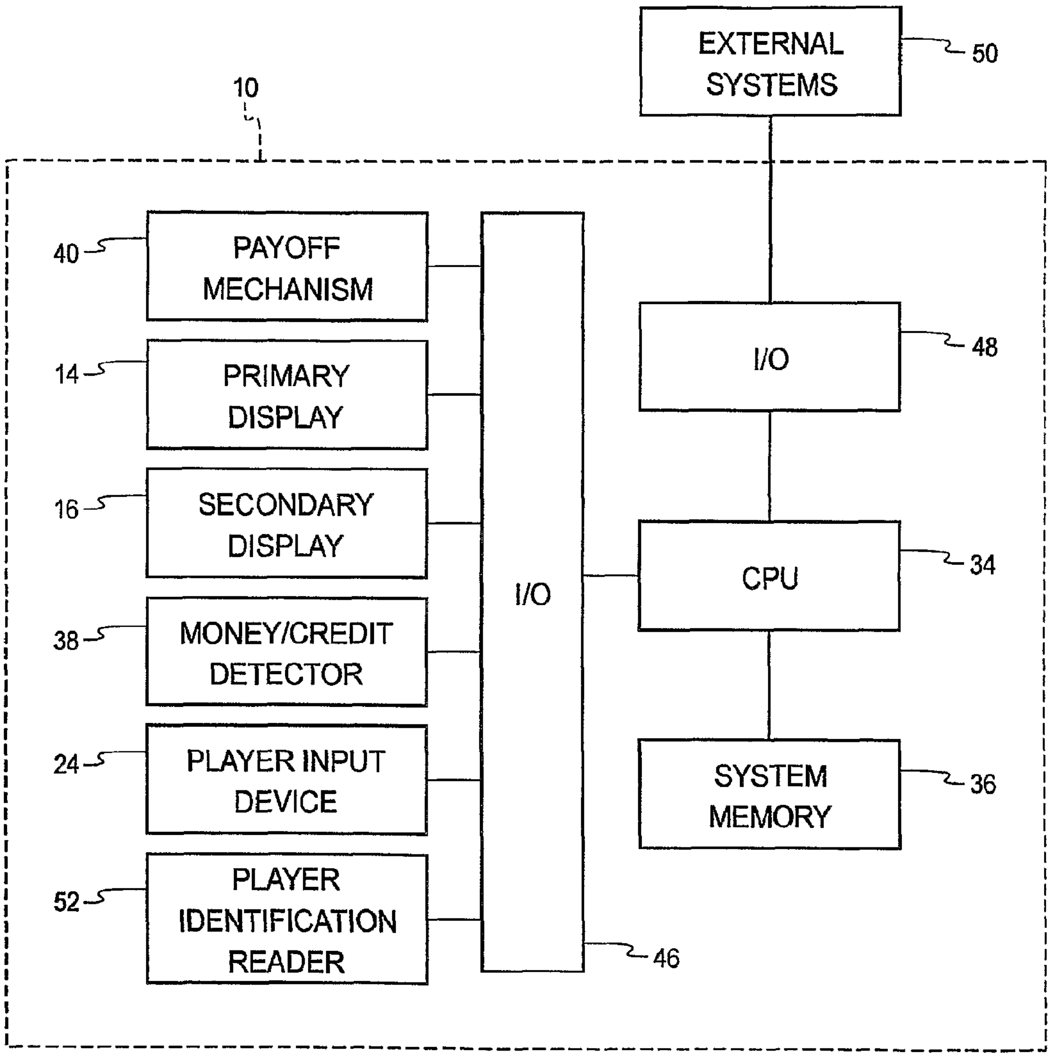
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
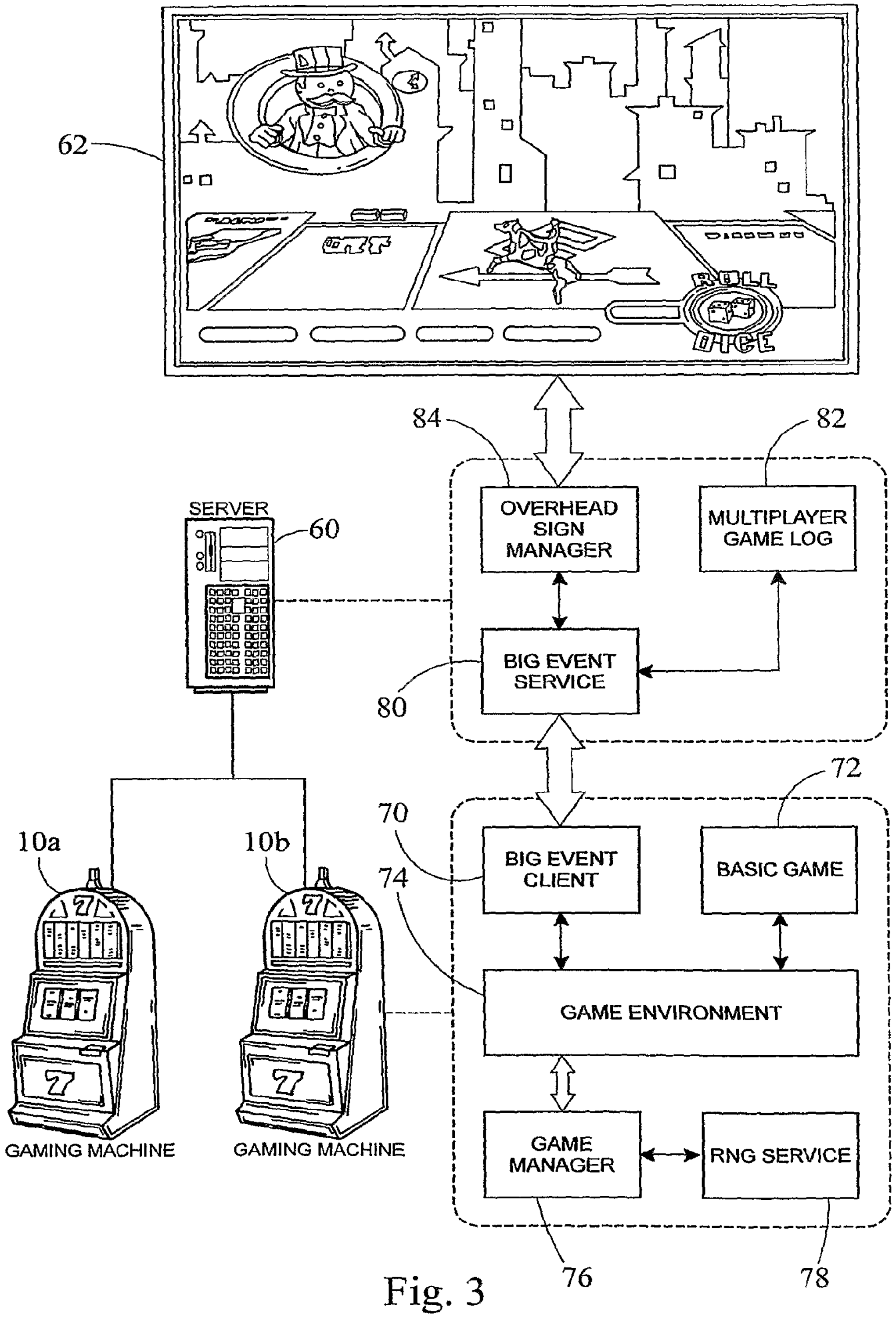
FIG. 3 is a representation of a gaming system for conducting a community event, according to one embodiment of the present invention.

Turning now to FIG. 3, a gaming system includes a plurality of gaming machines 10*a*, 10*b*, a server 60, and an optional overhead sign 62 that is viewable by players at gaming machines 10*a*, 10*b*. The gaming system is used for conducting a community event, which in this case is the "Monopoly® Big Event" game (hereinafter "Big Event Game"), in which a plurality of gaming machines 10*a*, 10*b* share community-event outcomes. The community event can be, for example, a community bonus game.

The Big Event Game is initiated by an event within one of the gaming machines 10*a*, 10*b*. For example, the Big Event Game can be triggered when a player achieves a particular set of symbols on the basic game. In another example, the Big Event Game can be triggered at random intervals. For example, the Big Event Game can be triggered if a selected random number is within a predetermined range. The gaming machine that initiates the Big Event Game is also referred to as the "initiator" machine.

When the Big Event Game has been triggered, other ones of the gaming machines 10*a*, 10*b* are notified and invited to participate. If a player accepts the invitation, then the Big Event Game is initiated on his or her gaming machine and it is displayed for allowing the player to observe outcomes of the Big Event Game.

At least one of the gaming machines 10*a*, 10*b* includes a Big Event Client 70, a basic game 72, a game environment 74, a game manager 76, and an RNG Service 78. The Big Event Client 70 is, for example, an additional software component that is added to the system memory 36 and that is controlled by the controller 34 (FIG. 2).

The server 60 includes a Big Event Service 80 (referred to hereinafter as a Big Event Coordinator 80), a multiplayer game log 82, and an optional overhead sign manager 84. The Big Event Coordinator 80 resides, and executes, on the server 60, which can also be, optionally, an overhead sign controller, a carousel controller, or a dedicated platform. In alternate embodiments, the Big Event Coordinator 80 may reside and execute on one of the gaming machines 10*a*, 10*b*.

In operation, when the Big Event Game is triggered, the RNG Service 78 within a designated or selected gaming machine, such as gaming machine 10*b*, dictates one or more of the outcomes in the Big Event Game. As such, the Big Event Coordinator 80 in the server 60 requests random outcomes, e.g., random numbers, from the RNG Service 78 when the Big Event Game is being played. After receiving one or more of the random outcomes from the Big Event Client 70, the Big Event Coordinator 80 distributes the received random outcomes to all participating machines of the gaming machines 10*a*, 10*b*. In other words, the Big Event Coordinator 80 provides a shared determination to participating ones of the gaming machines 10*a*, 10*b* but does not determine the random outcomes.

Figure 4:
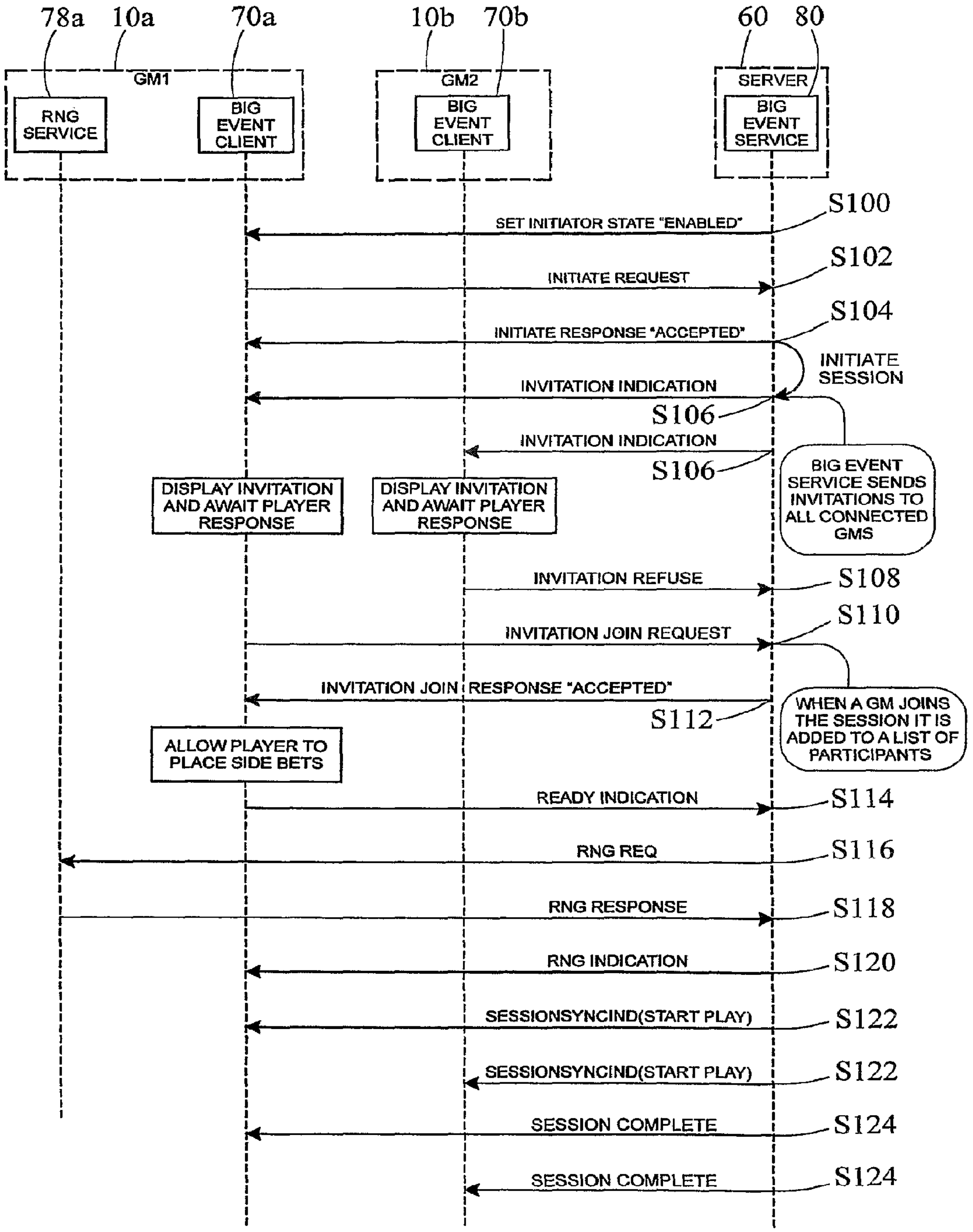
FIG. 4 is a diagrammatic of a community-event process, according to another embodiment of the present invention.

Referring to FIG. 4, a process of triggering and playing the Big Event Game is illustrated using the two gaming machines 10*a*, 10*b* (referred to as gaming machine one ("GM1") and gaming machine two ("GM2"), respectively) and the server 60 of FIG. 3. GM 1 includes the RNG Service 78*a* and the Big Event Client 70*a*. GM 2 includes its own Big Event Client 70*b*. Optionally, GM 2 can also include an RNG Service.

At step S100, GM 1 is enabled as the initiator. For example, the Big Event Coordinator 80 sends a message signal to the Big Event Client 70*a* of GM 1 to set the initiator to an "Enabled" state, e.g., the message signal can instruct GM 1 to "SET INITIATOR STATE 'ENABLED'." Then, at step S102, the enabled GM 1 sends a "INITIATE REQUEST" message signal to the Big Event Coordinator 80, which is a request for initiating a session of the Big Event Game. The Big Event Coordinator 80 accepts the "INITIATE REQUEST" message signal, at step S104, replying with an "INITIATE RESPONSE 'ACCEPTED'" message signal. The session of the Big Event Game is then initiated by the Big Event Coordinator 80.

Alternatively, more than one gaming machine can be enabled as an initiator. For example, if both GM 1 and GM 2 are enabled as initiators, then prioritization conditions may occur when both GM 1 and GM 2 attempt to initiate a session concurrently. If a session of the Big Event Game is already in progress, the Big Event Coordinator 80 may deny any subsequent requests. For example, if GM 2 requests the initiation of a session after a session has been initiated at the request of GM 1, the GM 2 request will be denied. The request will be denied indefinitely or until a predetermined condition occurs, e.g., until the session ends. In alternative embodiments, multiple concurrent or overlapping requests may be allowed.

When the session of the Big Event Game is initiated, the Big Event Coordinator 80 sends invitations to all of the connected gaming machines, i.e., GM 1 and GM 2. Thus, at step S106, each one of GM 1 and GM 2 receives an "INVITATION INDICATION" message signal from the Big Event Coordinator 80. Each one of GM 1 and GM 2 displays an invitation dialog and waits for a response from the corresponding player. Each player can choose to accept or reject the invitation.

Alternatively, the initiator is automatically included and the invitation is sent to other gaming machines. For example, in the above example an invitation is sent only to GM 2 because GM 1 is the initiator.

In this example, the player of GM 2 chooses not to participate in the Big Event Game. Consequently, at step S108, the player of GM 2 sends an "INVITATION REFUSE" message signal to the Big Event Coordinator 80. In contrast, the player of GM 1 chooses to participate in the Big Event Game. Consequently, at step S110, the player of GM 1 sends an "INVITATION JOIN REQUEST" message signal to the Big Event Coordinator 80. When GM 1 joins the Big Event Game, it is added to a list of participating gaming machines.

Alternatively, a global time limit may be used to limit the time for receiving a late acceptance. If, for example, the player of GM 2 sends an "INVITATION JOIN REQUEST" message signal after the global time limit has expired, then the Big Event Coordinator 80 returns a message signal indicating that the request is denied. As an example, a timer can be displayed on at least one of a primary display 14 or a secondary display 16 corresponding to one or more of GM 1, GM 2, and overhead sign 62 to let the player know how much time there is left.

At step S112, the Big Event Coordinator 80 accepts the "INVITATION JOIN REQUEST" from GM 1 and returns an "INVITATION JOIN RESPONSE 'ACCEPTED'" message signal to indicate acceptance of GM 1 as a participating gaming machine. In some embodiments the players of GM 1 and GM 2 may place one or more side wagers for the Big Event Game. Then, at step S114, the player of GM 1 sends a "READY INDICATION" message signal, to indicate that he or she is ready to continue playing the Big Event Game. Optionally, if the player of GM 1 does not place a side wager within a predetermined time limit, GM 1 closes the opportunity for placing side wagers and sends the "READY INDICATION" message signal without having received a side wager.

In the above example, participation of GM 1 is determined using a buy-in model, wherein participation is voluntary and it is decided by the player. Alternatively, in an eligibility model, a gaming machine participates in the Big Event Game after an eligibility determination has been made. Participation in the eligibility model is automatic and it is decided by the gaming machine, rather than the player. Each one of the connected gaming machines makes a determination whether the player is eligible for joining the Big Event Game. If the player is eligible, then the corresponding gaming machine sends an "INVITATION JOIN REQUEST" message signal to the Big Event Coordinator 80. If the player is not eligible, then the corresponding gaming machine sends an "INVITATION REFUSE" message signal to the Big Event Coordinator 80.

At this point, in the process of FIG. 4, all of the participating gaming machines, i.e., GM 1, are ready to continue playing the Big Event Game. The Big Event Coordinator 80 requests a random number (or numbers) from the RNG Service 78*a* of GM 1. The random number, which dictates one or more of the randomly selected outcomes of the Big Event Game, is requested at step S116 using a "RNG REQ" message signal. At step S118, GM 1 sends a message signal providing the requested random number, e.g., sending a "RNG RESPONSE" message signal.

If there is more than one participating gaming machine in the Big Event Game, random number generation can be provided by any of the participating gaming machines. For example, a first gaming machine 10*a* can provide random number generation related to the triggering of the Big Event Game (e.g., the Big Event Game is triggered if a randomly generated number is within a predetermined range) and a second gaming machine 10*b* can provide random number generation related to the randomly selected outcomes within the Big Event Game. Optionally, the Big Event Game can be triggered by the Big Event Coordinator 80.

In another example, a first gaming machine 10*a* can provide random number generation for a first outcome of the Big Event Game and a second gaming machine 10*b* can provide random number generation for a second outcome of the Big Event Game. Thus, the random number generation associated with the Big Event Game can be provided by any and more than one of the participating gaming machines 10*a*, 10*b*. The numbers selected during the random number generation are aggregated to encompass a plurality of outcomes for the session (e.g., the first outcome and the second outcome of the Big Event Game). The aggregation of outcomes is transmitted to the participating gaming machines. For example, if the Big Event Game is a community Monopoly® board game (FIG. 5), the first outcome can be a first roll of the dice and the second outcome can be a subsequent roll of the dice. The first roll of the dice and the second roll of the dice are aggregated and transmitted to the participating gaming machines.

Optionally, one or more of the randomly selected outcomes within the Big Event Game can have a number of sub-outcomes. For example, while playing the community Monopoly® board game, the player receives an award if an outcome of the game allows a player's game piece to move past the starting point of the game twice. To receive the award, the player will generally require a plurality of dice rolls, i.e., a plurality of sub-outcomes, to move across the board. Each dice roll requires a randomly generated number, which can be provided from any of the gaming machines 10*a*, 10*b*.

After the random number has been received from the RNG Service 78*a*, the Big Event Coordinator 80 sends at step S120 an "RNG INDICATION" message signal to all the participating gaming machines (which in the above example is only GM 1) to share the outcome determined by the RNG Service 78*a* of GM 1. Then, at step S122 the Big Event Coordinator 80 sends a "SESSIONSYNCIND (START PLAY)" message signal to all the connected gaming machines to coordinate, for example, the display and/or enactment of the shared outcome on each of the connected gaming machines 10*a*, 10*b*. The shared outcome of the game (e.g., moving a game piece across the Monopoly® game-board as a function of the randomly selected outcome indicated by the dice) is displayed on one or more of a corresponding primary display 14 and secondary display 16 of the gaming machines 10*a*, 10*b*. In addition, the shared outcome is optionally displayed on the overhead sign 62.

If the gaming machine 10*a*, 10*b* is a participating machine 10*a* in the Big Event Game, then it will commit the player's side wagers, if appropriate. If the gaming machine 10*a*, 10*b* is not participating in the Big Event Game, then it may use the message signal, for example, to inhibit timed expiration of the player's current eligibility while the game is in progress.

When the Big Event Game is finished, at step S124, the Big Event Coordinator 80 sends a "SESSION COMPLETE" message signal to each of the participating gaming machines. The participating gaming machines will, then, display game-related information, such as the player's winnings, and return to the basic game 72.

Figure 5:
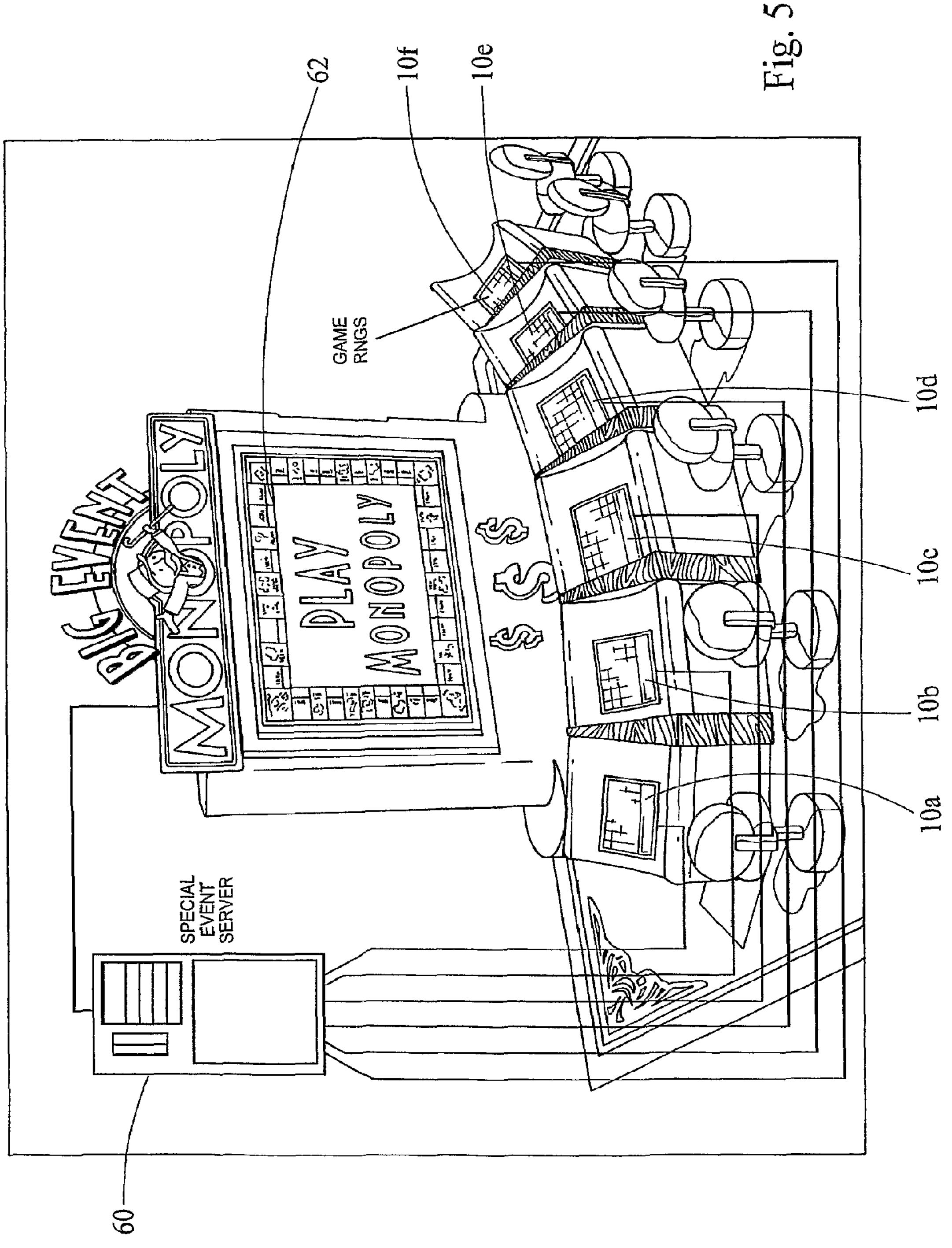
FIG. 5 is a perspective illustration of a gaming system for conducting a community event, according to yet another embodiment of the present invention.

Referring to FIG. 5, a gaming system for conducting a Big Event community bonus game includes a plurality of gaming machines 10*a*-10*f*, a server 60, and a signage 62. The gaming machines 10*a*-10*f* and the signage 62 are connected to the server 60, which is used for distributing information to and from one or more of the gaming machines 10*a*-10*f*.

The gaming machines 10*a*-10*f* are arranged in a semicircular arrangement around the signage 62, and each player of any of the gaming machines 10*a*-10*f* is able to observe the signage 62 for playing the bonus game. The bonus game can be played similarly to the method described above in reference to FIGS. 3 and 4.

Each gaming machine 10 includes a controller 34 (FIG. 2), which includes an RNG Service 78 for coordinating a basic game that is typically played locally and individually at the gaming machine 10. However, one or more of gaming machines 10*a*-10*f* has its controller 34 and associated RNG Service 78 used for determining the outcomes of the basic game and for determining a randomly selected outcome in the community event that is shared by several of the gaming machines 10*a*-10*f*. As such, at least one controller 34 has an RNG Service 78 for controlling the community-event outcome of a neighboring gaming machine 10.

In an alternative embodiment, the server 60 is replaced by any one of the gaming machines 10*a*-10*f*. For example, a first gaming machine 10*a* performs the functions of the server 60, e.g., game coordination, and becomes a master gaming machine 10*a*. Thus, the master gaming machine 10*a* performs the functions associated with any one of a game coordinator, a game initiator, and/or a random number source, i.e., the master gaming machine 10*a* is both a community-event server and a gaming machine.

In another alternative embodiment, a server 60 is coupled to a memory 36 and includes data for determining a randomly selected bonus-game outcome based on a randomly selected number. A gaming machine 10 includes an RNG Service 78 for selecting the randomly selected number. After the server 60 receives the randomly selected number from the RNG Service 78, the server 60 determines the randomly selected bonus-game outcome that corresponds to the randomly selected number. For example, the server 60 includes a look-up table that associates a plurality of randomly selected bonus-game outcomes corresponding to a plurality of randomly selected numbers. When a randomly selected number is sent by the RNG Service 78, the server 60 matches the selected number to the corresponding outcome. Alternatively, the RNG Service 78 determines both the randomly selected number and its associated randomly selected bonus-game outcome. In this embodiment, as opposed to only the randomly selected number being transmitted to the server 60, only the bonus-game outcome is transmitted to the server 60.

The functions of triggering a session of the community event, sharing information related to the community event, and determining outcomes of the community event can vary dynamically and/or randomly over time among the plurality of gaming machines 10*a*-10*f* and, optionally, the server 60. For example, the initiator machine that triggers a session of the community event can vary from one session of the community event to another session of the community event. As such, assuming that in a first session of the community event the initiator machine is the first gaming machine 10*a*, in a second session of the community event the initiator machine can be the first gaming machine 10*a*, the second gaming machine 10*b*, or the server 60. The type of triggering can be an outcome achieved during the wagering game, or it can be a random event unrelated to the wagering games being played at the gaming machines 10*a*-10*f* (e.g., selection of a random number within a predetermined range).

Information related to the community event (e.g., triggering of the game, sub-outcomes within the event, outcomes of the event, etc.) can be shared directly among the plurality of gaming machines 10*a*-10*f*, or can be shared indirectly via one of the gaming machines 10*a*-10*f* or the server 60. For example, in a first session of the community event the information is shared directly from the first gaming machine 10*a* to the second gaming machine 10*b*. In a second session of the community event, the information is shared indirectly from the first gaming machine 10*a* to the second gaming machine 10*b* via the third gaming machine 10*c*. Optionally, the information can be shared via the server 60.

Determination of outcomes of the community event can vary from one session of the community event to another session of the community event among the plurality of gaming machines 10*a*-10*f*. For example, a first outcome of the community event is determined by the first gaming machine 10*a* in a first session of the community event, a second outcome of the community event is determined by the second gaming machine 10*b* in a second session of the community event, and so on.

While the figures describe the same type of gaming machines within the system, in an alternative embodiment of the present invention, at least two of the gaming machines 10*a*-10*f* play a different type of wagering game, although they participate in the same community event. For example, each player of a first gaming machine 10*a* and a second gaming machine 10*b* play, individually, a different local slots game, but play the Big Event Game when triggered.

Each of these embodiments and obvious variations thereof is contemplated as falling within the spirit and scope of the claimed invention, which is set forth in the following claims.

What is claimed is:

1. A gaming system for playing a community event in which a plurality of player terminals may be eligible to participate, the plurality of player terminals playing respective underlying wagering games when the community event is not in session, the system comprising:

community-event clients included in respective different player terminals of the plurality of player terminals and operative to randomly determine respective community-event outcomes in a same session of the community event; and a community-event coordinator distinct from the community-event client and operative to receive the community-event outcomes from the respective community-event clients, and aggregate the received community-event outcomes and share the aggregated community-event outcomes with participating ones of the plurality of player terminals.

2. The gaming system of claim 1, wherein at least one of the community-event clients is operative to initiate the session.

3. The gaming system of claim 1, wherein the community-event coordinator is included in one of the plurality of player terminals.

4. The gaming system of claim 1, wherein the community-event coordinator is included in a server physically separate from the plurality of player terminals.

5. The gaming system of claim 1, wherein in response to initiation of the session, the community-event coordinator is operative to send invitations to at least two of the plurality of player terminals for participating in the session.

6. The gaming system of claim 1, wherein the community-event coordinator's operation of sharing the community-event outcomes varies dynamically or randomly over time among the plurality of player terminals and optionally a server.

7. The gaming system of claim 1, wherein the different player terminals vary dynamically or randomly among the plurality of player terminals from one session to the next of the community event.

8. A gaming system for playing a community event in which a plurality of player terminals may be eligible to participate, the plurality of player terminals playing respective underlying wagering games when the community event is not in session, the system comprising:

first and second community-event clients included in respective different player terminals of the plurality of player terminals, the first community-event client being operative to randomly determine a first community-event outcome in a first session of the community event, the second community-event client, but not the first community-event client, being operative to randomly determine a second community-event outcome in a second session of the community event, the second session being distinct from the first session; and a community-event coordinator distinct from the first and second community-event clients and operative to receive the first community-event outcome from the first community-event client and share the first community-event outcome with the player terminals participating in the first session, and receive the second community-event outcome from the second community-event client and share the second community-event outcome with the player terminals participating in the second session.

9. The gaming system of claim 8, wherein the first community-event client is operative to initiate the first session and the second community-event client is operative to initiate the second session.

10. The gaming system of claim 8, wherein the community-event coordinator is included in one of the plurality of player terminals.

11. The gaming system of claim 8, wherein the community-event coordinator is included in a server physically separate from the plurality of player terminals.

12. The gaming system of claim 8, wherein in response to initiation of at least one of the first session and the second session, the community-event coordinator is operative to send invitations to at least two of the plurality of player terminals for participating in the respective session.

13. The gaming system of claim 8, wherein the community-event coordinator's operation of sharing the first and second community-event outcomes varies dynamically or randomly over time among the plurality of player terminals and optionally a server.

14. The gaming system of claim 8, wherein the different player terminals vary dynamically or randomly among the plurality of player terminals from an initial session to a next session of the first and second community-event outcomes.

15. A method for playing a community event in which a plurality of player terminals may be eligible to participate, the plurality of player terminals playing respective underlying wagering games when the community event is not in session, the method comprising:

providing community-event clients included in respective different player terminals of the plurality of player terminals;

randomly determining, by the community-event clients, respective community-event outcomes in a same session of the community event;

receiving the community-event outcomes from the respective community-event clients by a community-event coordinator that is distinct from the community-event clients;

aggregating the received community-event outcomes by the community-event coordinator; and sharing the received community-event outcomes by the community-event coordinator with participating ones of the plurality of player terminals.

16. The method of claim 15, further comprising initiating the session by one of the community-event clients.

17. The method of claim 15, further comprising, in response to initiation of the session, sending invitations by the community-event coordinator to at least two of the plurality of player terminals for participating in the session.

18. The method of claim 15, further comprising varying dynamically or randomly over time among the plurality of player terminals and optionally a server the community-event coordinator's operation of sharing the community-event outcomes.

19. The method of claim 15, further comprising varying dynamically or randomly the different player terminals among the plurality of player terminals from one session to the next of the community event.

20. A method for playing a community event in which a plurality of player terminals may be eligible to participate, the plurality of player terminals playing respective underlying wagering games when the community event is not in session, the method comprising:

providing first and second community-event clients included in respective different player terminals of the plurality of player terminals;

randomly determining, by the first community-event client, a first community-event outcome in a first session of the community event;

randomly determining, by the second community-event client, but not the first community-event client, a second community-event outcome in a second session of the community event, the second session being distinct from the first session;

receiving the first community-event outcome from the first community-event client by a community-event coordinator that is distinct from the first and second community-event clients;

sharing the first community-event outcome by the community-event coordinator with the player terminals participating in the first session;

receiving the second community-event outcome from the second community-event client by the community-event coordinator; and sharing the second community-event outcome by the community-event coordinator with the player terminals participating in the second session.

21. The method of claim 20, further comprising initiating the first session by the first community-event client and initiating the second session by the second community-event client.

22. The method of claim 20, further comprising, in response to initiation of at least one of the first and second sessions, sending invitations by the community-event coordinator to at least two of the plurality of player terminals for participating in the respective session.

23. The method of claim 20, further comprising varying dynamically or randomly over time among the plurality of player terminals and optionally a server the community-event coordinator's operation of sharing the first and second community-event outcomes.

24. The method of claim 20, further comprising varying dynamically or randomly the different player terminals among the plurality of player terminals from one session to the next of the first and second community-event outcomes.

* * * * *